2,774,763
Patented Dec. 18, 1956

2,774,763

PREPARATION OF AMIDES OF LYSERGIC ACID

William L. Garbrecht, Indianapolis, Ind., assignor to Eli Lilly and Company, Indianapolis, Ind., a corporation of Indiana No Drawing. Application November 21, 1955, Serial No. 548,242

13 Claims. (Cl. 260—285.5)

This invention relates to an improved method of preparing pharmacologically active amides. More particularly, it relates to an improved method of preparing amides of lysergic acid.

By my invention I have provided a simple, convenient and broadly applicable process for producing amides of lysergic acid.

My novel process conveniently can be considered as a two-step process comprising first the formation of a mixed anhydride of lysergic and sulfuric acids, and second the formation of the desired lysergic acid amide by reacting the mixed anhydride with a nitrogenous base. As will be seen from the following disclosure, the intermediate mixed anhydride of lysergic and sulfuric acids can be, but need not be, isolated.

The mixed anhydride of lysergic and sulfuric acids is prepared by reacting a dispersion, i. e., a solution or suspension, of lysergic acid or one of its basic salts with sulfur trioxide. The formation of the mixed anhydride is rapid so that within a matter of minutes, the mixed anhydride is ready for utilization in the second step of the process.

The amide of the lysergic acid is prepared from the mixed anhydride by reacting the latter compound with a nitrogenous base containing at least one active hydrogen attached to nitrogen. This reaction also is quite rapid, especially when the nitrogenous base being reacted is a strongly basic amine, so that the reaction generally is substantially complete within a few minutes. When less basic amines are employed, it is desirable to allow a reaction period of up to about twenty minutes or thereabouts to insure the completion of the reaction.

The temperature at which the reaction between the lysergic acid compound and the sulfur trioxide is carried out is not critical but can be varied over a wide range. Preferably, temperatures substantially in excess of ambient room temperature, that is, about 25° C., should be avoided to reduce likelihood of formation of tarry by-products. Although temperatures up to about 35° C. are quite suitable for the carrying out of the reaction, lower emperatures in the neighborhood of about 0° C. or below can be advantageous insofar as such temperatures tend to reduce the production of minor amounts of colored reaction products which, although they do not appear to affect the yield adversely, can cause difficulties in the provision of the pure final product. Moreover, the amides of lysergic acid are themselves often quite unstable when they are impure or are present in various reaction mixtures, and hence high temperatures desirably are avoided to reduce the likelihood of the decomposition of the amides. Temperatures as low as −30° C. can readily be employed, the limiting factor being the temperature at which the dispersing agent solidifies. Since the mixed anhydrides of lysergic and sulfuric acids is relatively unstable, it is essential that a temperature of about 0° C. or preferably substantially lower be employed should the isolation of the anhydride be desired. In such event, the isolation most conveniently is effected by carrying out the reaction between the lysergic acid and the sulfur trioxide in a dispersing agent in which the mixed anhydride is insoluble. Alternatively, if the reaction is carried out in a solvent in which the mixed anhydride is soluble, it can be selectively precipitated by the addition of a solvent in which the mixed anhydride is insoluble. The precipitated mixed anhydride can be isolated by filtration or centrifugation or similar procedures. The anhydride thus obtained is an amorphous solid of tan to brown color. It is unstable and decomposes on standing even at low temperature. As is to be expected, the decomposition of the anhydride is quite rapid when it is exposed to a moist atmosphere.

For the preparation of the mixed anhydride, lysergic acid or a basic, i. e., a metallic or metalloid salt thereof, can be employed. The term "lysergic acid" as used herein includes the isomers of lysergic acid, e. g., d-lysergic acid, l-lysergic acid, d-isolysergic acid, and l-isolysergic acid. Also included are acids closely related to lysergic acid, for example, 5,6-dihydrolysergic acid and its acyl derivatives and 10,11-dihydroisolysergic acid. Illustrative examples of salts, both metallic and metalloid, of lysergic acid that are useful for the purpose of this invention include the lithium, potassium, barium, lead, calcium, ammonium, triethylamine, trimethylamine salts, and the like. Although in general the more water-soluble of the lysergic acid salts are productive of better yields of mixed anhydride, those salts which are substantially insoluble, are fully operative. The lysergic acid compound employed can be anhydrous or hydrated. Because of the difficulty of obtaining lysergic acid or its salts in completely anhydrous form, it is more convenient to employ the hydrated forms.

The sulfur trioxide employed for the production of the mixed anhydride desirably is purified and freed from sulfuric acid since the use of sulfur trioxide containing sulfuric acid in any substantial quantity causes a reduction in yield of mixed anhydride as compared to that obtainable with pure sulfur trioxide. Any conventional means of securing pure sulfur trioxide can be employed, as for example, distillation from phosphorous pentoxide. The sulfur trioxide itself can be prepared by any known method, for example, by distillation from oleum, by the catalytic oxidation of sulfur dioxide or from the commercially available stabilized sulfur trioxide known to the trade as "Sulfan B."

The mixed anhydride of lysergic and sulfuric acids using lysergic acid or a hydrate thereof as a starting material can be prepared by reacting one molecular equivalent of lysergic acid with about one or two molecular equivalents of sulfur trioxide. For the preparation of the mixed anhydride it is preferable to employ a salt of lysergic acid since the use of the salt leads to greater yields of the mixed anhydride. When a salt of lysergic acid is employed as a starting material, maximum yields of mixed anhydride are obtained when the lysergic acid salt and sulfur trioxide are reacted in a molar ratio of one molecular equivalent of lysergic acid salt to two molecular equivalents of sulfur trioxide. This ratio desirably is employed regardless of whether the salt is hydrated or anhydrous, since substantial variation from this molar ratio results in a decreased yield of mixed anhydride.

The reaction between the lysergic acid compound (whether acid or salt) and the sulfur trioxide is carried out in a dispersing agent, i. e., a solvent or suspending agent. The character of the agent employed is not critical, it being necessary only to use a dispersant which is inert with respect to the reactants, that is, one which will not react with or destroy the lysergic acid compound or the sulfur trioxide. Among suitable dispersants are included the hydrocarbons, for example, hexane; the dialkyl formamides, for example, dimethylformamide; the dialkylsulfoxides, for example, dimethylsulfoxide; the alkyl nitriles, for example, acetonitrile; and other solvents such as diethylcyanamide, dioxan, and the like.

As is well known, sulfur trioxide has the ability to form complexes or adducts with many solvents. It readily forms quite stable complexes with dimethylformamide and dioxan, both of which are specifically mentioned above. Such complexes are most conveniently employed in the preparation of the mixed anhydride. The complexes as such can be employed directly in the reaction mixture, or can be dissolved in an excess of the complexing agent, or can be mixed with a different dispersant and then reacted with the lysergic acid compound which also can be suspended or dissolved in a dispersing agent. The use of a sulfur trioxide complex is advantageous since it appears to moderate the course of the reaction and hence reduces the possibility of formation of undesirable by-products. Furthermore, it avoids most of the difficulties inherent in the handling of a dangerous reagent in gaseous or concentrated liquid form. Moreover, the amount of sulfur trioxide required to be reacted with the lysergic acid compound can readily be portioned out since the concentration of the sulfur trioxide in the complex or solution of the complex, and hence the amount of sulfur trioxide available for reaction, is easily determined by simple titration of an aliquot with a standard alkali solution.

The second step of the process of this invention, which comprises reacting the mixed anhydride with a nitrogenous base containing at least one active hydrogen attached to the nitrogen, is carried out simply by mixing the anhydride and nitrogenous base. The amine can be dispersed in an organic or aqueous dispersant, even water itself, and the dispersion added to the mixed anhydride, or the amine itself can simply be added to a dispersion of the mixed anhydride. As is obvious, the dispersant should not contain highly reactive functional groups which will react competitively with the mixed anhydride and so reduce the yield of the desired amide.

The temperature at which amide formation is carried out is not critical. The upper temperature limit is governed largely by the stability range of the mixed anhydride, and the lower temperature limit by the freezing point of the dispersant employed. Most conveniently the temperature employed is that which was used for the preparation of the mixed anhydride, since the invention is carried out most expeditiously by preparing the mixed anhydride and then adding the nitrogenous base to the anhydride without separating the anhydride.

The complete utilization of the mixed anhydride requires about five mols of nitrogenous base per mol of mixed anhydride. The mixed anhydride appears to contain in ionic association with it, a molecule of sulfur trioxide or sulfuric acid, which accounts for the requirement of an apparent excess of base. The use of less than five mols of base per mol of anhydride is operative but results in a lower yield of amide than that obtainable with five mols of base. Although greater molar proportions of nitrogenous base can be employed, no advantage accompanies their use.

Nitrogenous bases useful in my process include ammonia, either as liquid ammonia, or as ammonium hydroxide, and hydrazine; primary amines, such as ethylamine, glycine, propylamine, aniline, and the like; secondary amines, such as morpholine, diphenylamine, methylaniline, diethylamine, and the like; aminoalcohols, such as 2-aminopropan-1-ol, isovalinol, ephedrine, 2-(N-benzylamino)-propan-1-ol, and the like. A specific aminoalcohol, l-(+)-2-aminopropan-1-ol, is especially usefully employed in my invention since its reaction with the mixed anhydride of d-lysergic and sulfuric acids produces the pharmacologically active compound ergonovine. It is a particular advantage of my process, and quite unforeseen, that the reaction product of an aminoalcohol and the mixed anhydride of lysergic and sulfuric acids consists solely of the desired amide with no undesired ester by-product. For example, when l-(+)-2-aminopropan-1-ol is reacted with the mixed anhydride of d-lysergic and sulfuric acids, the only lysergic acid derivatives produced in isolatable quantities are ergonovine and its isomeric amide, ergonovinine.

The lysergic acid amides produced in accordance with this invention are readily isolated by a conventional method which comprises treating the reaction mixture with water to obtain an aqueous solution of the lysergic acid amide, extracting the amide into a water-immiscible solvent and then crystallizing the amide or a salt thereof. Other conventional isolation and purification procedures known to the art art also applicable. As is well recognized by those skilled in the ergot alkaloid field, many of the ergot alkaloids and related compounds are crystallizable only with difficulty, and hence careful manipulation is often required to obtain crystalline products.

This invention is further illustrated by the following examples:

EXAMPLE 1

*Preparation of mixed anhydride of d-lysergic and sulfuric acids*

1.64 g. of potassium d-lysergate monohydrate are dissolved in 25 ml. of dimethylformamide. The solution is cooled to about −20° C. and 10 ml. of a similarly cooled solution of dimethylformamide containing 0.8 g. of sulfur trioxide are added. The solutions are thoroughly mixed and the mixture is allowed to stand for several minutes. The mixed anhydride of lysergic and sulfuric acids is separated from the solution by adding several volumes of cold (−20° C.) anhydrous ethyl ether to the mixture whereupon the mixed anhydride precipitates as a tan-colored amorphous solid. The solid is isolated by filtration of the mixture through a dry sintered glass filter in a thoroughly dry atmosphere.

EXAMPLE 2

*Preparation of ergonovine*

7.15 g. of di-lysergic acid monohydrate and 1.05 g. of lithium hydroxide monohydrate are dissolved in 100 ml. of methanol. The methanol solution is evaporated to a syrup in vacuo, and to the syrup are added 500 ml. of anhydrous dimethylformamide. The solution is concentrated in vacuo at a temperature of about 50° C. to a volume of about 150 ml. to distill off methanol and water. The remaining solution of the lithium salt of d-lysergic acid is cooled to about 10° C. and 74.5 ml. of a 0.67 molar solution of sulfur trioxide-dimethylformamide complex in dimethylformamide are added. The mixture is stirred thoroughly and is allowed to stand for about five minutes to assure the complete formation of the mixed anhydride of lysergic and sulfuric acids. To the solution are then added with stirring 9.4 g. of l-(+)-2-aminopropan-1-ol. The mixture is allowed to stand for five minutes during which time the anhydride and the amine react together to produce ergonovine. 300 ml. of 20 percent aqueous sodium chloride solution are added to the reaction mixture, and the aqueous mixture is extracted five times with 300 ml. portions of ethylene dichloride. The ethylene dichloride extracts which contain ergonovine and some isomeric ergonovinine formed during the reaction are combined and evaporated to a syrup in the cold in vacuo. The syrup is dissolved in a minimum amount of methanol and sufficient maleic acid is added to make the solution slightly acidic. The solution is treated with a small amount of decolorizing carbon and is filtered to remove the carbon. To the filtrate are added about three volumes of ether. The mixture is allowed to stand for several hours at about 0° C. whereupon ergonovine maleate separates in crystalline form. The maleate salt is filtered off and dried in air.

From the filtrate, ergonovinine, the amide of the isomeric isolysergic acid, is recovered as follows:

The filtrate is evaporated to a syrup and to the syrup are added about 200 ml. of saturated aqueous sodium chloride solution. Suficient aqueous ammonium hydroxide is added to make the solution slightly basic and the basic solution is extracted several times with 100 ml. portions of ethylene dichloride. The ethylene dichloride extracts are combined and evaporated in vacuo yielding a residue comprising ergonovinine.

The ergonovinine can, if desired, be crystallized in the form of its nitrate or some other salt or can be isomerized to ergonovine by the procedure disclosed by Stoll and Hoffman in Helv. Chim. Acta. 26, 944 (1943).

EXAMPLE 3

*Preparation of d-lysergic acid morpholide*

3.24 g. of potassium d-lysergate monohydrate are dissolved in 25 ml. of anhydrous dimethylformamide. The solution is cooled to about 10° C. and is treated with 18.9 ml. of a 1.06 molar solution of sulfur trioxide-dimethylformamide complex in dimethylformamide. After a few minutes 4.3 g. of morpholine are added to the reaction mixture with stirring. The mixture is allowed to stand for a few minutes during which time the formation of the morpholine amide of lysergic acid is completed. The mixture is treated with 100 ml. of saturated sodium chloride containing 5 ml. of concentrated ammonium hydroxide. The lysergic acid amide is recovered from the aqueous mixture by extracting repeatedly with ethylene dichloride until tests of the ethylene dichloride extracts with Van Urk reagent indicates that the extraction is substantially complete. The combined extracts are dried with anhydrous magnesium sulfate and are concentrated by evaporation in vacuo in the cold. The residual syrup comprising d-lysergic acid morpholide is dissolved in 25 ml. of methanol, the solution is acidified with excess maleic acid, and is diluted with ether to incipient turbidity. The mixture is allowed to stand in a refrigerator for several hours, whereupon off-white, needle-like crystals of d-lysergic acid morpholide acid maleate are formed and precipitate from the solution.

The above procedure yields about 1.5 g. of crystals which melt indefinitely with decomposition on a Fisher-John block at about 195° C.

From the crystallization mother liquors, after concentration, neutralization, and re-extraction with ethylene dichloride, there can be obtained about 0.8 g. of amorphous di-isolysergic acid morpholide. This material can be isomerized to d-lysergic acid morpholide by the procedure disclosed by Smith and Timmis in J. Chem. Soc. 139, II, 1168 (1936).

EXAMPLE 4

*Preparation of isomeric ergonovine*

A preparation is carried out according to the method of Example 2 except that 1.68 g. of barium d-lysergate is used in place of lithium d-lysergate, and dl-2-aminopropan-1-ol is added as an aqueous solution.

EXAMPLE 5

*Preparation of N-benzyl ergonovine*

The preparation of N-benzyl ergonovine is carried out according to the method of Example 2 except that 1.43 g. of d-lysergic acid is treated with 5.5 ml. of 1.0 molar solution of sulfur trioxide-dimethylformamide complex in dimethylformamide. 2.72 g. of 1-(+)-2-benzylamino-propan-1-ol are dissolved in dimethylformamide and added to the mixture containing the mixed anhydride of d-lysergic and sulfuric acids. The isolation of N-benzyl-ergonovine as the acid maleate salt is effected by the method described in Example 2.

N-benzyl ergonovine acid maleate crystallizes from a methanol-ether mixture in the shape of rods. It decomposes at about 183° C.

EXAMPLE 6

*Preparation of ergine*

A solution containing the mixed anhydride of d-lysergic acid and sulfuric acid is prepared according to the method of Example 1 using 1.62 g. of anhydrous potassium d-lysergate and 8.3 ml. of 1.12 molar solution of sulfur trioxide-dimethylformamide complex in dimethylformamide. 5 ml. of concentrated aqueous ammonia are added to the cooled mixture of the anhydride, and the mixture is kept at about 0° C. for a few minutes. The ergine is isolated by treating the reaction mixture with 20 percent aqueous sodium chloride solution and extracting the aqueous mixture with ethylene dichloride according to the method of Example 2. The residue left after the evaporation of the combined ethylene dichloride extracts comprises a mixture of d-lysergic acid amide and d-isolysergic acid amide. The residue is dissolved in methanol containing slightly over a molar equivalent of maleic acid, ether is added to the solution to the point of turbidity, and the mixture is chilled to about 0° C. A quantity of fine, colorless needles of ergine maleate are thus obtained which are purified by recrystallization from a mixture of methanol and ethyl ether.

Recrystallized ergine acid maleate prepared by the above method was found to exist as the mono-methanol solvate. Crystals of the compound decomposed when heated to about 165.5° C. They possessed the following specific rotation:

$$[\alpha]_D^{25} = +61.6° \text{ (in ethanol)}$$

Isolysergic acid hydrazide can be prepared using the procedure described above except that a solution of hydrazine hydrate is used in place of aqueous ammonia.

EXAMPLE 7

*Preparation of d-lysergic acid anilide*

A solution containing the mixed anhydride of d-lysergic and sulfuric acids is prepared according to the method of Example 2 from 3.24 g. of potassium d-lysergic monohydrate dissolved in 25 ml. of anhydrous dimethylformamide and 16.4 ml. of a 1.21 molar solution of a complex of sulfur trioxide and dimethylformamide in dimethylformamide. The solution containing the anhydride is stirred at a temperature of about 0° C. for five minutes and 4.66 g. of aniline are added. The reaction mixture is stirred for five minutes, and is then treated with 200 ml. of a saturated sodium chloride solution, and the desired lysergic acid anilide is isolated in the form of the maleate salt according to the method of Example 2. The methanol-ether mixture containing the maleate of d-lysergic acid anilide is cooled, yielding a mixture of crystals and syrup. The supernatant liquid is decanted and the mixture of crystals and syrup remaining is dissolved in boiling methanol. The solution is decolorized with charcoal and the charcoal is removed by filtration. Upon cooling the filtrate to about 0° C., fine, colorless needles of d-lysergic acid anilide acid maleate precipitate. The crystals are filtered off, are washed with a mixture of equal parts of methanol and ethyl ether, and are dried in vacuo. A second crop of crystals of a lesser degree of purity can be obtained by concentrating and cooling the filtrate.

EXAMPLE 8

*Preparation of d-lysergic acid methylanilide*

The method of Example 7 is repeated, using 1.65 g. of potassium d-lysergate monohydrate dissolved in 25 ml. of dimethylformamide and 8.2 ml. of a 1.2 molar solution of a complex of sulfur trioxide and dimethylformamide in dimethylformamide. 3.21 g. of methylaniline are added to the solution of the mixed anhydride of d-lysergic and sulfuric acids. The reaction mixture is kept at room temperature for about 18 hours. The d-lysergic acid methylanilide is isolated by the method of Example 7.

The residue remaining after the evaporation of the ethylene dichloride is dissolved in benzene, decolorized with charcoal and filtered. The filtrate is treated with an excess of an ethereal solution of dibenzoyl-d-tartaric acid. A tan solid comprising the dibenzoyl-d-tartaric acid salt of d-lysergic acid methylanilide separates. The tan solid is collected and dried in air.

The dibenzoyl-d-tartaric acid salt of d-lysergic acid methylanilide thus obtained decomposes at about 143–145° C. It weighs about 0.4 g.

EXAMPLE 9

*Preparation of d-lysergic acid 1-ephedride*

The mixed anhydride of d-lysergic and sulfuric acids is prepared in dimethylformamide from 1.64 g. of potassium d-lysergate and 0.8 g. of sulfur trioxide by the procedure described in Example 3. 4.1 g. of 1-ephedrine in dimethylformamide are added to the solution of the mixed anhydride. The d-lysergic acid 1-ephedride which is formed is obtained in ethylenedichloride solution by the procedure described in Example 2. The residue of d-lysergic acid 1-ephedride obtained by the evaporation of the ethylene dichloride solution is dissolved in about 400 ml. of boiling 95 percent ethanol, is decolorized with charcoal, and the charcoal is removed by filtration. The filtrate is evaporated in vacuo at a temperature below about 20° C. to a volume of about 8 ml. at which concentration a cream-colored solid comprising d-lysergic acid 1-ephedride separates from solution. The cream-colored solid is collected by filtration and is dried in air, yielding 0.73 g. of d-lysergic acid 1-ephedride. The mother liquor is treated with base according to the method of Smith and Timmis (supra) to convert the d-isolysergic acid 1-ephedride to d-lysergic acid 1-ephedride. An additional 0.21 g. of d-lysergic acid 1-ephedride can thus be obtained.

EXAMPLE 10

*Preparation of d-lysergic acid diethylamide*

About 1.64 g. of potassium d-lysergic acid hydrate are suspended in about 25 ml. of anhydrous hexane. To the suspension is added a solution of 0.8 g. of sulfur trioxide dissolved in 25 ml. of acetonitrile, the addition being carried out with the reagents maintained at about 5° C., and with sufficient stirring. To the mixture is added a solution of about 1.82 g. of diethylamine dissolved in 25 ml. of ether. After standing for about five minutes the solution is extracted about five times with 100 ml. portions of water. The aqueous extracts are combined and are saturated with sodium chloride. The saturated solution is extracted five times with 100 ml. portions of ethylene dichloride. The ethylene dichloride extracts are combined and are evaporated in vacuo leaving a residual syrup comprising a mixture of the diethyl amides of d-lysergic and d-isolysergic acids.

The two amides can be separated as follows:

The syrup is dissolved in a mixture of 60 ml. of benzene and 20 ml. of chloroform and the solution is passed over a chromatographic column of 150 g. of basic alumina. The chromatogram is developed with the same solvent mixture. The more rapidly moving of the two blue fluorescing bands consists of the diethyl amide of d-lysergic acid. About 2 liters of solvent mixture are required to elute the first band. The eluate is treated with a sufficient amount of tartaric acid to convert the amide to the tartrate salt, and the salt is isolated by evaporating the solution to a low volume to cause separation of the tartrate salt of the diethyl amide of d-lysergic acid.

The diethyl amide of di-isolysergic acid is recovered by eluting it from the alumina column with chloroform, and evaporating the chloroform eluate.

EXAMPLE 11

*Preparation of ergonovine*

1.62 g. of racemic potassium lysergate are dissolved in 25 ml. of anhydrous dimethylformamide. 7.9 ml. of a 1.26 molar solution of sulfur trioxide-dimethylformamide complex dissolved in dimethylformamide are added and the mixture is maintained at about 10° C. with stirring for a few minutes. 1.88 g. of 1-(+)-2-aminopropan-1-ol are added to the solution of the mixed anhydride and the mixture is stirred for five minutes while maintaining the temperature at about 10° C. 100 ml. of saturated sodium chloride solution and 5 ml. of concentrated ammonium hydroxide are added to the reaction mixture, and the aqueous mixture is extracted five times with 50 ml. portions of ethylene dichloride. The ethylene dichloride extracts are combined and dried, and the ethylene dichloride is removed by evaporation in vacuo. The residual syrup containing the two 1-(+)-propanol amides of dl-lysergic acid is treated with methanol and excess maleic acid to convert the two amides into their maleate salts. The mixture of amide maleates is precipitated from the methanol solution by the addition of ethyl ether, and the precipitated mixture is filtered off and dried in air.

I claim:

1. The method which comprises reacting sulfur trioxide with a member of the group consisting of lysergic acid and basic salts thereof at a temperature not substantially exceeding room temperature to produce a mixed anhydride of lysergic and sulfuric acids, and reacting said mixed anhydride with a nitrogenous base having at least one hydrogen linked to nitrogen, thereby to produce a lysergic acid amide, and isolating said amide.

2. The method which comprises reacting in a dispersant which is inert with respect to the reactants, about one molecular equivalent of a compound selected from the class consisting of lysergic acid and basic salts thereof with about two molecular equivalents of sulfur trioxide at a temperature not substantially exceeding room temperature, to produce a dispersion of the mixed anhydride of lysergic and sulfuric acids, and adding to said dispersion about five molecular equivalents of a nitrogenous base having at least one hydrogen linked to nitrogen, thereby to produce an amide of lysergic acid, and isolating said amide.

3. The method which comprises reacting at a temperature not substantially exceeding room temperature, a dispersion in dimethylformamide of about one molecular equivalent of a compound of the class consisting of lysergic acid and basic salts thereof, with a sulfur trioxide-dimethylformamide complex dissolved in dimethylformamide, thereby to form the mixed anhydride of lysergic and sulfuric acids, and combining the dispersion containing said mixed anhydride with about five molecular equivalents of a nitrogenous base having at least one hydrogen linked to nitrogen, thereby to produce a lysergic acid amide, and isolating said amide.

4. The method of claim 3 in which the sulfur trioxide is reacted with the lithium salt of lysergic acid.

5. The method of claim 3 in which the nitrogenous base is a secondary amine.

6. The method of claim 3 in which the nitrogenous base is a primary amine.

7. The method of claim 6 in which the primary amine is an amino alcohol.

8. The method of claim 7 in which the amino alcohol is 1-(+)-2-aminopropan-1-ol.

9. The method which comprises reacting at about room temperature about one molecular equivalent of the lithium salt of lysergic acid dissolved in dimethylformamide with about two molecular equivalents of a sulfur trioxide-dimethylformamide complex dissolved in dimethylformamide, to form the mixed anhydride of sulfuric and lysergic acids, and adding to the solution of said mixed anhydride about five molecular equivalents of 1-(+)-2- aminopropan-1-ol, thereby to produce ergonovine, and isolating said ergonovine.

10. The process step which comprises reacting sulfur trioxide with a member of the group consisting of lysergic acid and basic salts thereof in a dispersant which is inert with respect to the reactants, and at a temperature not substantially exceeding room temperature, thereby to form the mixed anhydride of lysergic and sulfuric acids.

11. The process step which comprises reacting a solution of about one molecular equivalent of the lithium salt of lysergic acid in dimethylformamide with a dimethylformamide solution containing about two molecular equivalents of a sulfur trioxide-dimethylformamide complex, said reaction being carried out at a temperature of about ambient room temperature, thereby to produce a mixed anhydride of lysergic and sulfuric acids.

12. The process step which comprises reacting in a dispersant which is inert with respect to the reactants, a mixed anhydride of lysergic and sulfuric acids with a nitrogenous base having at least one hydrogen attached to nitrogen, thereby to produce an amide of lysergic acid.

13. A mixed anhydride of lysergic and sulfuric acids.

No references cited.